United States Patent
Yun et al.

(10) Patent No.: US 10,321,040 B2
(45) Date of Patent: Jun. 11, 2019

(54) IMAGE APPARATUS AND METHOD FOR CALCULATING DEPTH BASED ON TEMPERATURE-CORRECTED FOCAL LENGTH

(71) Applicant: Samsung Electronics Co., Ltd., Suwon-si, Gyeonggi-do (KR)

(72) Inventors: Se-Hwan Yun, Hwaseong-si (KR); Daekwan Kim, Suwon-si (KR); Chaesung Kim, Seoul (KR); DongKi Min, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 318 days.

(21) Appl. No.: 15/206,745

(22) Filed: Jul. 11, 2016

(65) Prior Publication Data

US 2017/0109889 A1 Apr. 20, 2017

(30) Foreign Application Priority Data

Oct. 15, 2015 (KR) .......................... 10-2015-0144221

(51) Int. Cl.
*G06T 7/593* (2017.01)
*H04N 5/232* (2006.01)
(Continued)

(52) U.S. Cl.
CPC ......... *H04N 5/23212* (2013.01); *G06T 7/593* (2017.01); *H04N 13/239* (2018.05); *H04N 13/271* (2018.05); *H04N 13/296* (2018.05)

(58) Field of Classification Search
None
See application file for complete search history.

(56) References Cited

U.S. PATENT DOCUMENTS 8,330,822 B2 * 12/2012 McEldowney ....... A63F 13/213
315/309
8,390,703 B2 3/2013 Iijima et al.
(Continued)

FOREIGN PATENT DOCUMENTS

JP 2004-233600 A 8/2004
JP 2007-322128 A 12/2007
(Continued)

OTHER PUBLICATIONS

Zhengzhen Liu et al., "Distance Measurement System Based on Binocular Stereo Vision", 2009 International Joint Conference on Artificial Intelligence, Apr. 25, 2009, pp. 456-459.

*Primary Examiner* — Tahmina N Ansari
(74) *Attorney, Agent, or Firm* — Harness, Dickey & Pierce, P.L.C.

(57) ABSTRACT

An image apparatus may be configured to calculate a depth of an object relative to the image apparatus. The image apparatus may include an image sensor that may capture a plurality of images of the object. Depth calculation may include calculating a binocular disparity using the plurality of images, measuring a local temperature value from at least one temperature sensor, correcting a focal length of at least a portion of the image apparatus according to the measured local temperature value, and calculating a depth of the object using the binocular disparity and the corrected focal length. The corrected focal length may be determined based on a focal length variation value. The focal length variation value may be determined based on performing contrast autofocus on one or more captured images and the local temperature value.

20 Claims, 12 Drawing Sheets

(51) Int. Cl.
*H04N 13/271* (2018.01)
*H04N 13/296* (2018.01)
*H04N 13/239* (2018.01)

(56) References Cited

U.S. PATENT DOCUMENTS

| | | | |
|---|---|---|---|
| 8,395,693 B2 | 3/2013 | Iijima et al. | |
| 2004/0064065 A1* | 4/2004 | Pescatore, Jr. | H04N 13/334 |
| | | | 600/558 |
| 2005/0128287 A1* | 6/2005 | Hanzawa | H04N 13/239 |
| | | | 348/42 |
| 2009/0080876 A1* | 3/2009 | Brusnitsyn | G02B 7/365 |
| | | | 396/128 |
| 2009/0135246 A1 | 5/2009 | Uchiyama et al. | |
| 2013/0135439 A1* | 5/2013 | Kakuko | H04N 13/00 |
| | | | 348/46 |
| 2014/0375851 A1 | 12/2014 | Lee et al. | |
| 2017/0109889 A1* | 4/2017 | Yun | G06T 7/593 |

FOREIGN PATENT DOCUMENTS

| | | |
|---|---|---|
| JP | 2009-53011 | 3/2009 |
| JP | 2009-250785 A | 10/2009 |
| JP | 2011-169853 A | 9/2011 |
| JP | 2014-52335 | 3/2014 |
| JP | 2014-179841 A | 9/2014 |

\* cited by examiner

IMAGE APPARATUS AND METHOD FOR CALCULATING DEPTH BASED ON TEMPERATURE-CORRECTED FOCAL LENGTH

CROSS-REFERENCE TO RELATED APPLICATION

This US non-provisional patent application claims priority under 35 USC § 119 to Korean Patent Application No. 10-2015-0144221, filed on Oct. 15, 2015, the entirety of which is hereby incorporated by reference.

BACKGROUND

The present disclosure relates to image apparatuses and object depth calculation using object images captured by image apparatuses.

An image sensor is configured to convert an optical image into an electrical signal. With the recent advance in the computer industry and the communication industry, a demand for image sensors with improved performance is increasing in applications such as digital cameras, camcorders, personal communication systems (PCS's), game consoles, security cameras, medical microcameras, and robots. As the demand for such image sensors is increasing, a multi-layer image sensor including multiple layers is being developed as a next generation image sensor in order to obtain more pixel information, for example, more color information.

In some cases, image apparatuses may be used to capture multiple optical images of an object. A distance between the object and image sensors of image apparatuses may be determined based on binocular disparity between separate images captured by different image sensors in an image apparatus.

SUMMARY

Example embodiments relate to image apparatuses configured to calculate a depth of an object according to local temperature and one or more captured images of the object.

According to some example embodiments, a method for calculating a depth of an object relative to an image apparatus, the image apparatus including a depth pixel array, the depth pixel array including a an image pixel, the image pixel including a left pupil sensor and a right pupil sensor, may include generating a left image of the object at the left pupil sensor, generating a right image of the object at a right pupil sensor, calculating a binocular disparity of the object based on the left image and the right image, measuring a local temperature value associated with the image pixel, calculating a corrected focal length associated with the image pixel based on the measured local temperature value, and calculating the depth of the object relative to the image apparatus, based on both the binocular disparity and the corrected focal length.

According to some example embodiments, a method may include measuring a first local temperature value associated with an image apparatus based on processing sensor data generated by at least one temperature sensor, performing a first contrast autofocus of at least one image captured by the image apparatus to calculate a first autofocus step code, based at least in part upon the measured first local temperature value, measuring a second local temperature value based on processing sensor data generated by the at least one temperature sensor, the second local temperature value being different from the first local temperature value, performing a second contrast autofocus of at least one image captured by the image apparatus to calculate a second autofocus step code, based at least in part upon the measured second local temperature value, and calculating a focal length variation based on both the first autofocus step code and the second autofocus step code.

According to some example embodiments, a method for calculating a depth of an object relative to an image apparatus, the image apparatus including an image sensor and a lens configured to direct incident light of the image sensor, may include capturing a plurality of images of the object at separate, respective portions of the image sensor, calculating a binocular disparity of the object based on the plurality of images, measuring a current local temperature value associated with the lens, performing a contrast autofocus of at least one image of the plurality of images to calculate an autofocus step code, based at least in part upon the measured current local temperature value, calculating a focal length variation based on both the autofocus step code and a second autofocus step code, the second autofocus step code being associated with a reference focal length of the lens, the reference focal length being associated with a reference local temperature value, calculating a corrected focal length of the lens based on the focal length variation, and calculating the depth of the object relative to the image apparatus, based on both the binocular disparity and the corrected focal length.

BRIEF DESCRIPTION OF THE DRAWINGS

The forgoing and other features of inventive concepts will be described below in more detail with reference to the accompanying drawings of non-limiting embodiments of inventive concepts in which like reference characters refer to like parts throughout the different views. The drawings are not necessarily to scale, emphasis instead being placed upon illustrating principles of inventive concepts. In the drawings.

DETAILED DESCRIPTION

Figure 1:
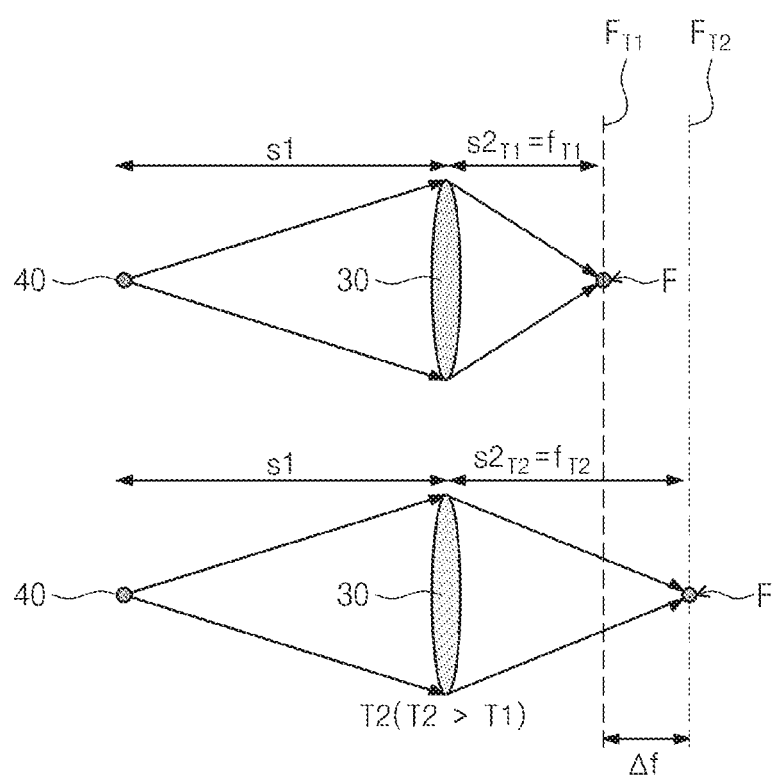
FIG. 1 illustrates focal length difference depending on temperature when a distance between an object and a lens is infinite according to some example embodiments of the inventive concepts.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an etched region or an implanted region illustrated as a rectangle may have rounded or curved features. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

An image apparatus according to some example embodiments of the inventive concepts may include a lens configured to focus incident light onto one or more image sensors of the image apparatus. The image apparatus may be configured to correct a calculated focal length of the lens according to a temperature of the lens or ambient temperature around the lens and calculate a depth of an object, relative to the image apparatus, using a phase-detection autofocus (AF) and the corrected focal length to improve accuracy of the depth. A temperature sensor may be disposed inside the image sensor to measure the temperature.

A typical camera lens may perform a function to concentrate light of an object and model the concentrated light with a lens equation. The lens equation may be expressed as Equation (1) below:

$$\frac{1}{f} = \frac{1}{s1} + \frac{1}{s2} \qquad \text{Equation (1)}$$

wherein s1 represents a distance between the object and the lens, s2 represents a distance between the lens and a focus, and f represents focal length.

Assuming that s1 is infinite, s2 may be approximated to f.

FIG. 1 illustrates a focal length difference depending on temperature when a distance s1 between the object and a lens is infinite, according to some example embodiments of the inventive concepts. FIG. 1 illustrates a focus F of light from an object 40 that is refracted through lens 30 at a first local temperature value T1 and a second local temperature value T2. Referring to FIG. 1, assuming that s1 is infinite, the focal length "f" may vary depending on local temperature values associated with the lens 30. As shown in FIG. 1, the focal length f may vary based on whether a local temperature associated with the lens 30 is a first local temperature value T1 or a second local temperature value T2 (T2>T1). The focal length f of the lens 30 at the second local temperature value T2 may be greater than the focal length f of the lens 30 at the first local temperature value T1 by Δf.

Figure 2A:
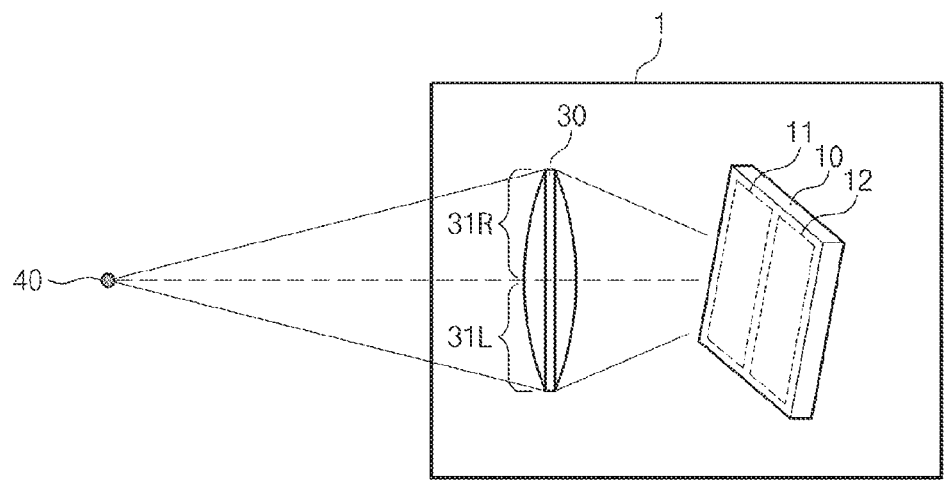
FIG. 2A and FIG. 2B illustrate image apparatuses according to some example embodiments of the inventive concepts.
Figure 2B:
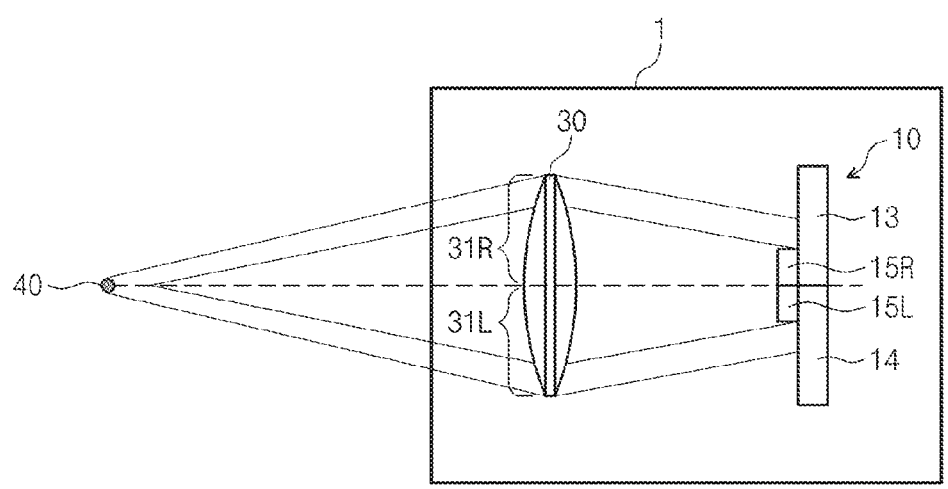

FIG. 2A and FIG. 2B illustrate image apparatuses according to some example embodiments of the inventive concepts.

Referring to FIG. 2A, an image apparatus 1 may include an image pixel 10 and a lens 30. The image pixel 10 may be referred to as an image sensor 10. In the example embodiments illustrated in FIG. 2A, the image sensor 10 may be a two-phase detection (2PD) sensor. The image pixel 10 may include a right sensor 11 (also referred to as a right pupil sensor 11) configured to capture an image of the object through a right lens pupil 31R (a right image) and a left sensor 12 (also referred to as a left pupil sensor 12) configured to capture an image of the object through a left lens pupil 31L (a left image). When focuses of left and right images of the object captured by the right pupil sensor 11 and the left pupil sensor 12 do not match each other, the images are associated with a binocular disparity of the object at different positions in a sensor space.

Referring to FIG. 2B, an image apparatus 1 may include an image pixel 10 and a lens 30. In the example embodiments illustrated in FIG. 2A, the image sensor 10 may be a metal shield pixel sensor. The image sensor 10 may include a right sensor 13 (also referred to as a right pupil sensor 11) configured to capture an image of the object through a right lens pupil 31R (a right image) and a left sensor 14 (also referred to as a left pupil sensor 12) configured to capture an image of the object through a left lens pupil 31L (a left image). The right sensor 13 may be a metal shield sensor that includes metal shield 15R. The left sensor 14 may be a metal shield sensor that includes metal shield 15L. When focuses of left and right images of the object captured by the right pupil sensor 13 and the left pupil sensor 14 do not match each other, the images are associated with a binocular disparity of the object at different positions in a sensor space.

Figure 2C:
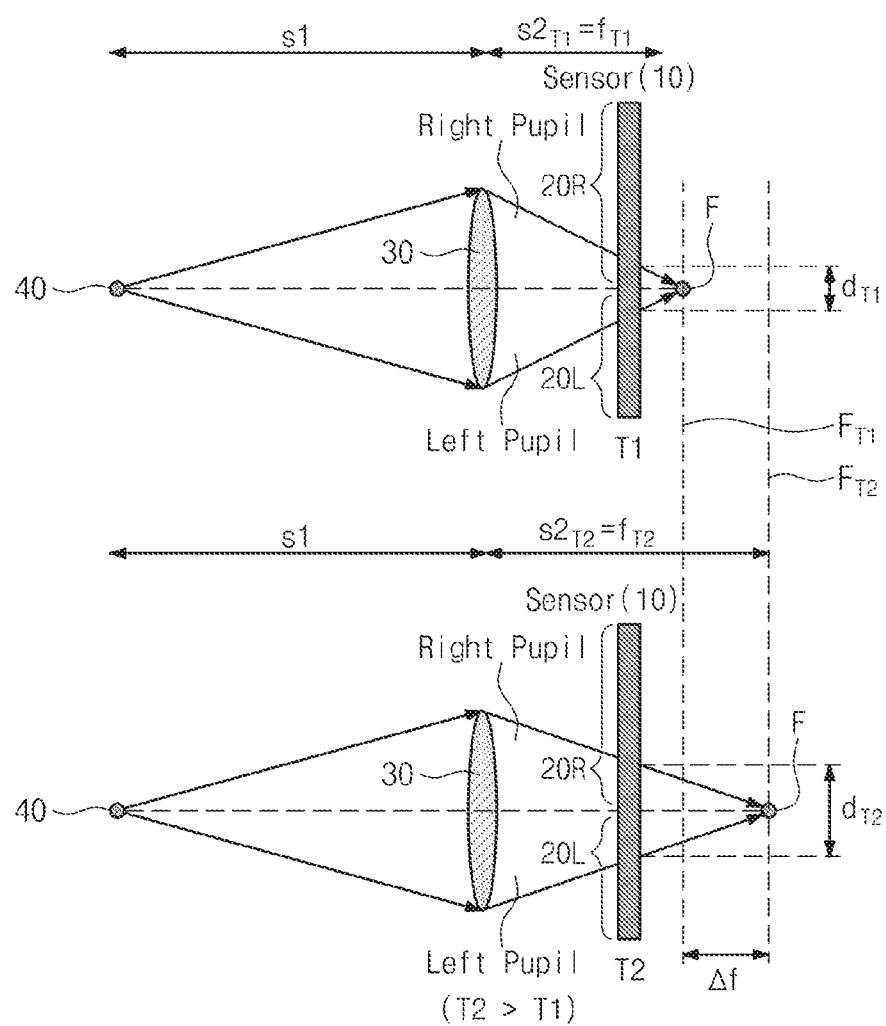
FIG. 2C illustrates focal length variation and a disparity difference depending on temperature in an image sensor according to some example embodiments of the inventive concepts.

FIG. 2C illustrates a focal length variation and a disparity difference depending on temperature in an image sensor. In FIG. 2C, an image pixel 10 may include a right portion 20R and a left portion 20L. In some example embodiments, the right portion 20R may be one of right sensor 11 or right sensor 13. In some example embodiments the left portion 20L may be one of left sensor 12 or left sensor 14.

Referring to FIG. 2C, if and/or when a local temperature value associated with lens 30 is the first local temperature value T1, $f_{T1}$ represents a first focal length of lens 30 and $d_{T1}$ represents a first binocular disparity of left and right images of object 40 captured by the left and right portions 20L and 20R of the image sensor 10. If and/or when a local temperature value associated with lens 30 is the second local temperature value T2, and where the second local temperature value T2 is greater than the first local temperature value T1, $f_{T2}$ represents a second focal length of lens 30 and $d_{T2}$ represents a second binocular disparity of left and right images of object 40 captured by the left and right portions 20L and 20R of the image sensor 10. The second focal length $f_{T1}$ may be greater than the first focal length $f_{T1}$ by a variation value Δf, and the second disparity $d_{T2}$ may be made greater than the first disparity $d_{T1}$ by Δd.

In FIGS. 1 to 2A, 2B, and 2C, the focal length or the binocular disparity may increase as a local temperature value associated with lens 30 increases. However, this is merely exemplary for description of inventive concepts and it should not be understood that increase in lens temperature surely leads to increase in the focal length or the binocular disparity.

Figure 3:
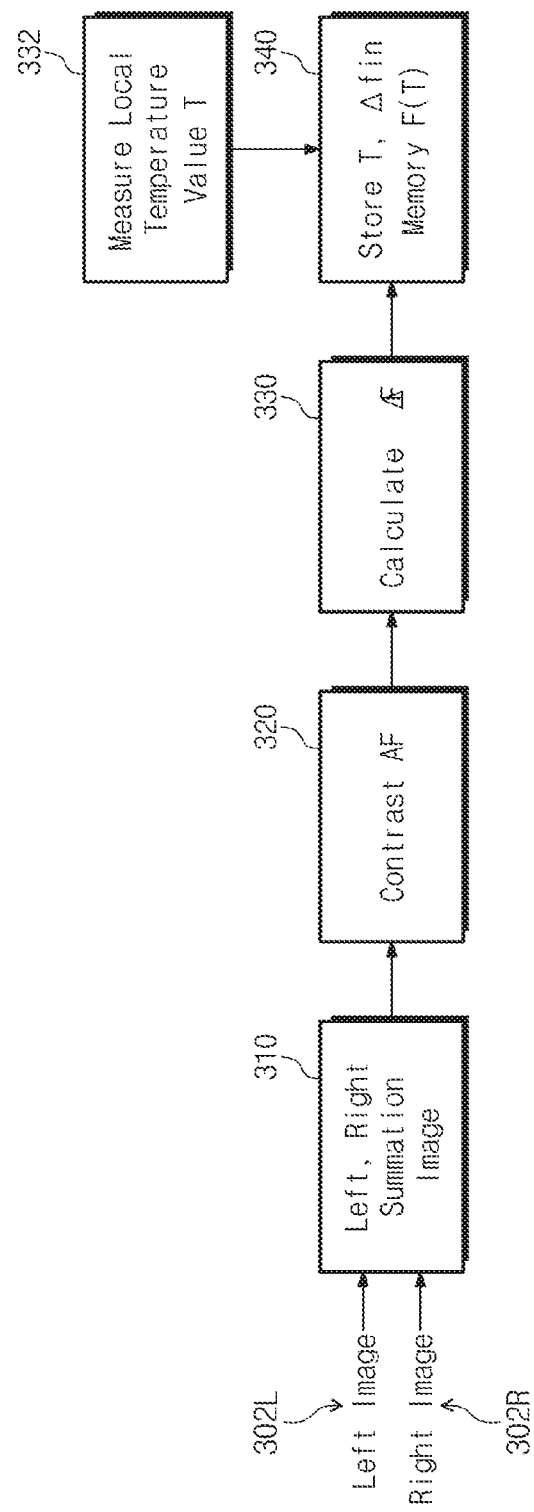
FIG. 3 is a block diagram illustrating a method to calculate a focal length variation depending on temperature associated with an image sensor according to some example embodiments of the inventive concepts.

FIG. 3 is a block diagram illustrating a method to calculate a focal length variation Δf depending on temperature associated with an image sensor 10 according to some example embodiments of the inventive concepts. The image sensor 10 may be a two-phase detection (2PD) sensor. A temperature associated with an image sensor 10 may include a local temperature value associated with a lens 30 in a common image apparatus 1 as the image sensor, where the lens 30 is configured to direct incident light onto at least a portion of the image sensor. The method may be implemented by an image apparatus 1 in which the image sensor 10 is included. A method for calculating the focal length variation of the image sensor 10 will now be described below with reference to FIG. 3.

A left image and a right image may be sensed ("captured") by a left pupil sensor and a right pupil sensor of the image sensor 10, respectively. The left image and the right image may include associated image data. Image data associated with an image may include pixel values of the image, including one or more of pixel color values, pixel depth values, some combination thereof, or the like.

At 310, the image apparatus 1 may implement a summation of left image data 302L and right image data 302R to generate summation data. The summation data may be associated with a summation image, such that summation of left image data 302L and right image data 302R may include a summation of corresponding pixel values of the left and right images to generate a summation image. Summation data may include pixel values that are a sum of the corresponding pixel values of the left and right images.

At 320 the image apparatus 1 may implement contrast autofocus (AF), also referred to as contrast detection autofocus, on the summation data to generate contrast autofocus output data. At 330, the image apparatus 1 may calculate a focal length variation Δf associated with the image sensor 10 based on the contrast AF data. The focal length variation Δf may be a difference between reference focal length of lens 30 and a current focal length of lens 30 if and/or when the local temperature value associated with the lens 30 is a particular value. A contrast AF method may be implemented by the image apparatus 1 to calcuate a lens 30 position where a fixed object 40 is in-focused. Such a calculation may include calculating a lens 30 focal length associated with the image data 302L and 302R. Thus, the calculation may include calculating a lens 30 focal length associated with a current local temperature value T associated with the lens 30.

At 332, the image apparatus 1 may measure a current ("present") local temperature value T associated with the lens 30. The image apparatus 1 may include a temperature sensor disposed at a portion of a lens 30 or around the lens 30, and the image apparatus 1 may measure the local temperature value T based on the temperature sensor. In some example embodiments, the temperature sensor may be included in an image sensor 10 or be disposed at a suitable position inside a module in the image apparatus 1. At 340, the image apparatus 1 may store the measured local temperature value T and the focal length variation Δf in a memory of the image apparatus 1.

Figure 4:
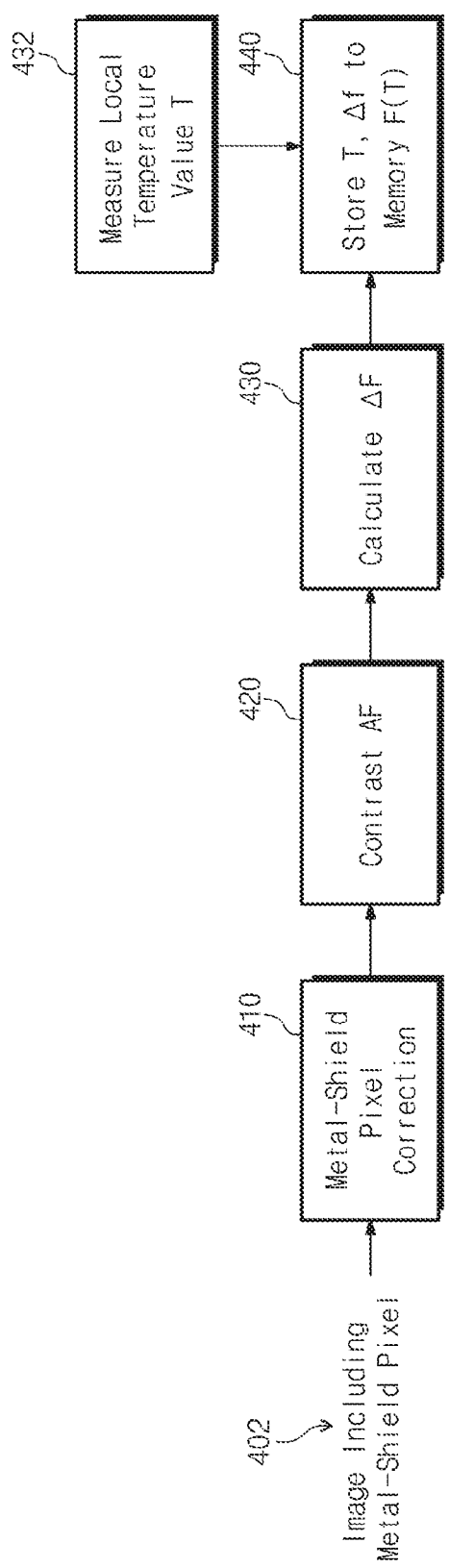
FIG. 4 is a block diagram illustrating a method to calculate a focal length variation depending on temperature associated with an image sensor 10 according to some example embodiments of the inventive concepts.

FIG. 4 is a block diagram illustrating a method to calculate a focal length variation Δf depending on temperature associated with an image sensor 10 according to some example embodiments of the inventive concepts. The image sensor 10 may be a metal shield sensor. A temperature associated with an image sensor 10 may include a local temperature value associated with a lens 30 in a common image apparatus 1 as the image sensor, where the lens 30 is configured to direct incident light onto at least a portion of the image sensor. The method may be implemented by an image apparatus 1 in which the image sensor 10 is included. A method for calculating the focal length variation of the image sensor 10 will now be described below with reference to FIG. 4.

At 410, the image apparatus 1 may implement correction of left or right image data 402 generated by at least one of left and right pupil sensors to generate corrected image data. At 420, the image apparatus 1 may implement contrast AF on the corrected image data. At 430, the image apparatus 1 may calculate a focal length variation Δf associated with the image sensor 10 based on the contrast AF. At 432, the image apparatus 1 may measure a current ("present") local temperature value T. At 332, the image apparatus 1 may measure a current ("present") local disposed at a portion of a lens 30 or around the lens 30, and the image apparatus 1 may measure the local temperature value T based on the temperature sensor. At 440, the image apparatus 1 may store the measured local temperature value T and the focal length variation Δf in a memory of the image apparatus 1.

Figure 5:
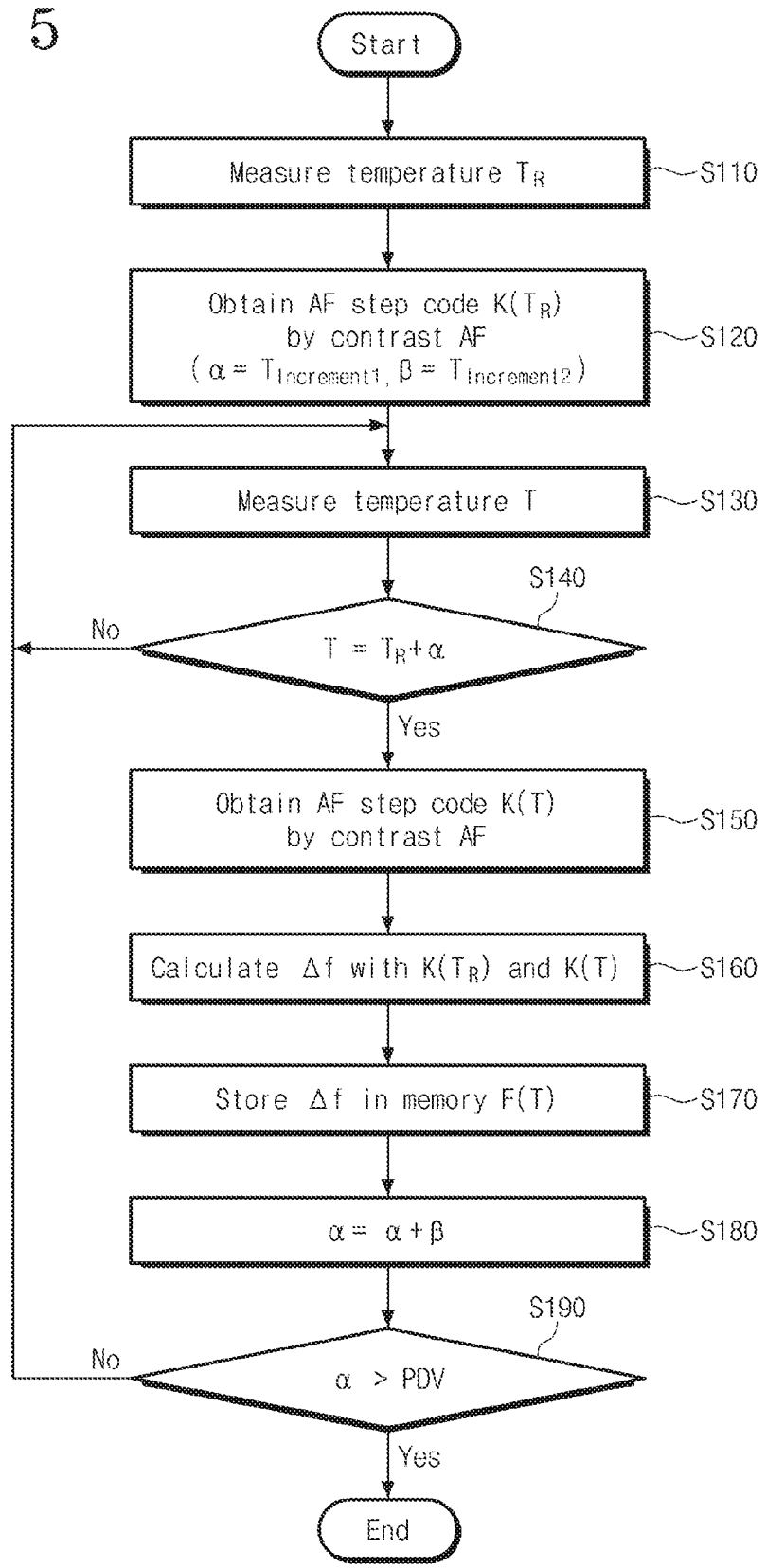
FIG. 5 is a flowchart illustrating a method for storing focal length variation depending on temperature of an image sensor according to some example embodiments of the inventive concepts.

FIG. 5 is a flowchart illustrating a method for storing a focal length variation Δf depending on temperature of an image sensor according to some example embodiments of the inventive concepts. The method may be implemented by one or more portions of the image apparatus 1. The method for storing the focal length variation Δf will now be described below with reference to the flowchart in FIG. 5.

A temperature sensor included in the image apparatus 1 may measure a reference local temperature value $T_R$ associated with at least one of a lens 30 of the image apparatus 1 and an image sensor 10 of the image apparatus 1 (S110). An AF step code $K(T_R)$ at the reference local temperature value $T_R$ may be obtained based on implementing a contrast AF (S120). First temperature increment $T_{Increment1}$ is denoted by α, and second temperature increment $T_{Increment2}$ is denoted by β. Sizes ("magnitudes") of the first temperature increment α and the second temperature increment β may be equal to each other or different from each other.

The temperature sensor may sense local temperature value T when an image of an object is captured by one or more portions of an image sensor 10 of the image apparatus 1 (S130). A determination may be made as to whether the sensed local temperature value T is a value obtained by summing up the first temperature increment α and reference local temperature value $T_R$ (S140). When the local temperature value T is the value obtained by adding the first temperature increment α to reference local temperature value $T_R$, an AF step code K(T) at the reference local temperature value $T_R$ may be obtained by the contrast AF (S150). Meanwhile, when the local temperature value T is not the value obtained by summing up the first temperature increment α and reference local temperature value $T_R$, the flow may return to S130.

The focal length variation Δf may be calculated from the second AF step code K(T) at the current local temperature value T and the first step code $K(T_R)$ at the reference local temperature value $T_R$ (S160). The focal length variation Δf may be a difference between focal lengths of the lens 30 at the reference local temperature value $T_R$ and the current local temperature value T. The focal length variation Δf may satisfy Equation (2) below.

$$\Delta f = (K(T) - K(T_R)) \times (\text{actual length per 1 step lens position}) \quad \text{Equation (2)}$$

That is, the focal length variation Δf may correspond to a value obtained by subtracting the first AF step code $K(T_R)$ from the second AF step code K(T). The focal length variation Δf depending on the current local temperature value T may be stored in a memory (S170). A value obtained by adding the second temperature increment β to the first temperature increment α may be a new first temperature increment α (S180). A determination may be made as to whether the new first temperature increment α is greater than a desired (and/or alternatively predetermined) decided value PDV (S190). When the new first temperature increment α is greater than a desired (and/or alternatively predetermined) decided value PDV, the method for storing focal length variation Δf may be completed. Meanwhile, if and/or when the new first temperature increment α is not greater than a desired (and/or alternatively predetermined) decided value PDV, the flow may return to S130.

It should be understood that in inventive concepts are not limited to the order or the number of operations in the method for storing focal length variation Δf described with reference to FIG. 5.

Figure 6:
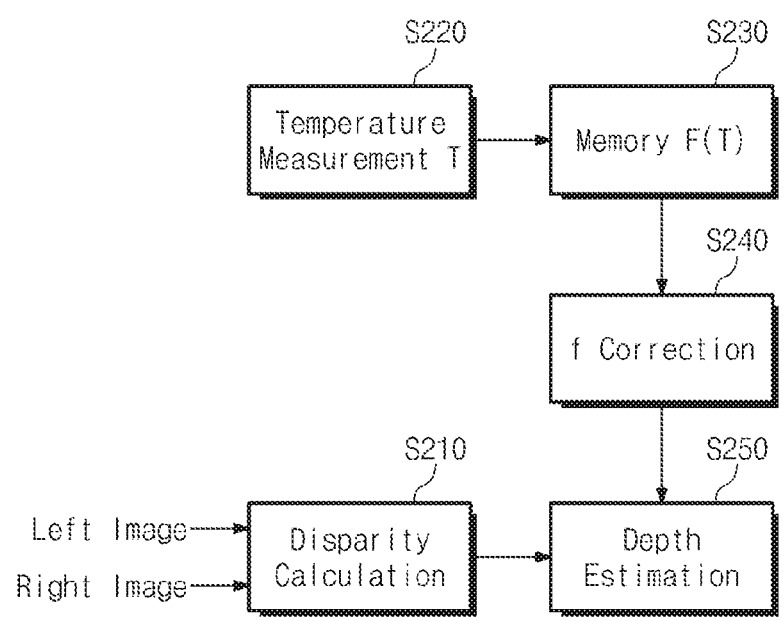
FIG. 6 is a flowchart illustrating a depth calculation method of an image apparatus according to some example embodiments of the inventive concepts.

FIG. 6 is a flowchart illustrating a depth calculation method of an image apparatus according to some example embodiments of the inventive concepts. The depth calculation method shown in FIG. 6 may be implemented by the image apparatus 1. The depth calculation method will now be described below with reference to FIG. 6.

A left image and a right image of an object may be sensed ("captured") by a left pupil sensor and a right pupil sensor of an image sensor 10, respectively. A binocular disparity d of the image sensor 10 may be calculated from image data of the sensed left image and image data of the sensed right image (S210). For example, a binocular disparity d may be calculated based on a difference in position of an object in the left and right images, respectively. The position of the object in a given image may be calculated based on determining a set of image coordinates associated with the position of the object in the given image. If and/or when the object is photographed (e.g., one or more images of the object are captured), a current local temperature value T may be measured from a temperature sensor (S220). A focal length variation Δf corresponding to the measured current local temperature value T may be accessed from a stored memory (S230). A focal length f of a lens of the image apparatus 1 may be corrected, to generate a corrected focal length f, based on the calculated focal length variation Δf (S240). A depth "D" of the object may be calculated based on the corrected focal length f and the binocular disparity d (S250). In some example embodiments, the depth may be calculated according to equation 3 as shown below, where "B" is a baseline distance between the separate image sensor portions, sensors, etc. that may generate the separate left and right images of the object.

$$D = f(B)/d \quad \text{Equation 3:}$$

The baseline may be a value that is stored in a memory of the image apparatus 1. Separate baseline values may be associated with different sets of image sensors, portions of image sensors, etc. A given baseline value may be selected based on the portions of an image sensor, separate image sensors, etc. used to capture the given left and right images used to calculate the binocular disparity "d."

It should be understood that in inventive concepts are not limited to the order or the number of operations in the depth calculation method described with reference to FIG. 6.

Figure 7:
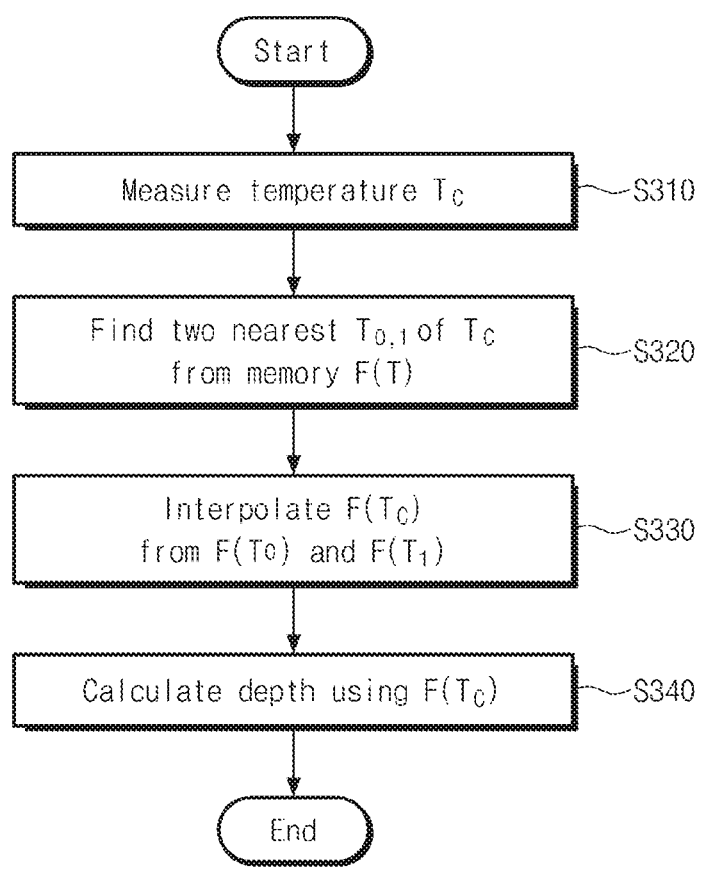
FIG. 7 is a flowchart illustrating a depth calculation method of an image apparatus according to some example embodiments of the inventive concepts.

FIG. 7 is a flowchart illustrating a depth calculation method of an image apparatus according to some example embodiments of the inventive concepts. The depth calculation method shown in FIG. 7 may be implemented by the image apparatus 1. The depth calculation method will now be described below with reference to the flowchart in FIG. 7.

A temperature sensor included in the image apparatus 1 may measure current local temperature value $T_C$ (S310). When focal length variation Δf corresponding to the current local temperature value $T_C$ does not exist in the stored memory of the image apparatus 1, the image apparatus 1 may calculate a focal length variation Δf depending on the current local temperature value $T_C$ using linear interpolation. For achieving this, two local temperature values $T_0$ and $T_1$ closest to the measured current local temperature value $T_C$ may be identified in a stored focal length variation table in a memory of the image apparatus 1. The current local temperature value $T_C$ may be between the two local temperature values $T_0$ and $T_1$. For example, the current local temperature value $T_C$ may be greater than the local temperature value $T_0$ and less than the local temperature value $T_1$. Focal length variation $F(T_C)$ depending on the current local temperature value $T_C$ may be interpolated from focal length variation $F(T_C)$ corresponding to the first local temperature value $T_0$ and focal length variation $F(T_1)$ corresponding to the second local temperature value $T_1$. A linear algorithmic relationship may be generated, where the relationship is a linear relationship between a local temperature value and a corresponding foal length variation value. The focal length variation $F(T_C)$ may be determined based on the generated linear algorithmic relationship and the current local temperature value $T_C$. The image apparatus 1 may calculate a depth of the object relative to the image apparatus 1 using the interpolated focal length variation $F(T_C)$ (S340).

It should be understood that inventive concepts are not limited to the order or the number of operations in the depth calculation method described with reference to FIG. 7.

Figure 8:
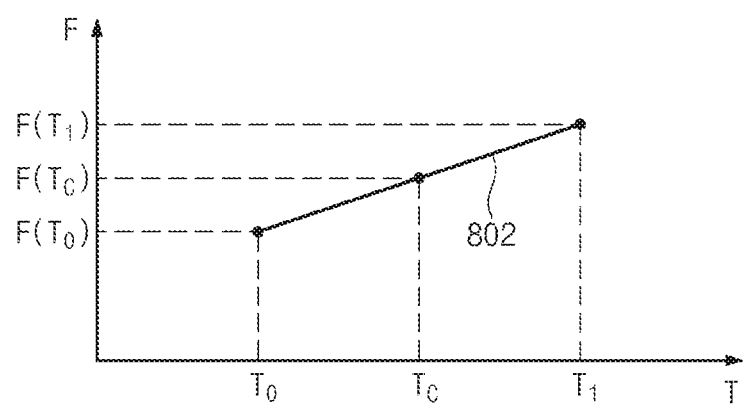
FIG. 8 illustrates interpolation of focal length variation of an image apparatus according to some example embodiments of the inventive concepts.

FIG. 8 illustrates interpolation of a focal length variation of an image apparatus according to some example embodiments of the inventive concepts. Referring to FIG. 8, the focal length variation $F(T_C)$ depending on local temperature value $T_C$ between first local temperature value $T_1$ and second local temperature value $T_2$ may be decided by linear interpolation between focal length variation $F(T_0)$ corresponding to the first local temperature value $T_0$ and focal length variation $F(T_1)$ corresponding to the second local temperature value $T_1$. The first local temperature value $T_1$ and second local temperature value $T_2$ may be stored in an array in the memory of the image apparatus, where the array includes a corresponding focal length variation value $F(T_0)$ corresponding to the first local temperature value $T_0$ and a focal length variation $F(T_1)$ corresponding to the second local temperature value $T_1$. The image apparatus 1 may select a local temperature value in the array and identify the corresponding focal length variation value that corresponds to the selected local temperature value in the array.

As shown in FIG. 8, at least two temperature values $T_0$ and $T_1$ may be selected, where the at least two temperature values are included in an array in a memory of the image apparatus 1. The corresponding first focal length variation $F(T_0)$ and second focal length variation $F(T_1)$ may be identified from the array. A linear relationship 802 may be generated based on a linear algorithmic relationship between the first and second focal length variation values $F(T_0)$ and $F(T_1)$ and the first and second local temperature values $T_0$ and $T_1$. Based on the generated linear relationship 802 and the measured current local temperature value $T_C$, a current focal length variation value $F(T_C)$ may be determined.

In some example embodiments, a depth of an object may be calculated independently of temperature values and corresponding focal length variation values. For example, in some example embodiments, the image apparatus may capture multiple images of an object, including left and right images, calculate a binocular disparity of the object based on the images, perform a contrast autofocus on at least one of the images and a measured local temperature value to calculate an AF step code, and calculate a focal length variation based on a reference AF step code. The focal length variation may be used with the binocular disparity to calculate the depth of the object. The reference AF step code may be calculated separately based on images captured by the image apparatus in association with a measured reference local temperature value. At least the reference AF step code may be stored in a memory of the image apparatus, and the image apparatus may access the stored reference AF step code to calculate the focal length variation based on the calculated AF step code associated with the current local temperature value.

Figure 9:
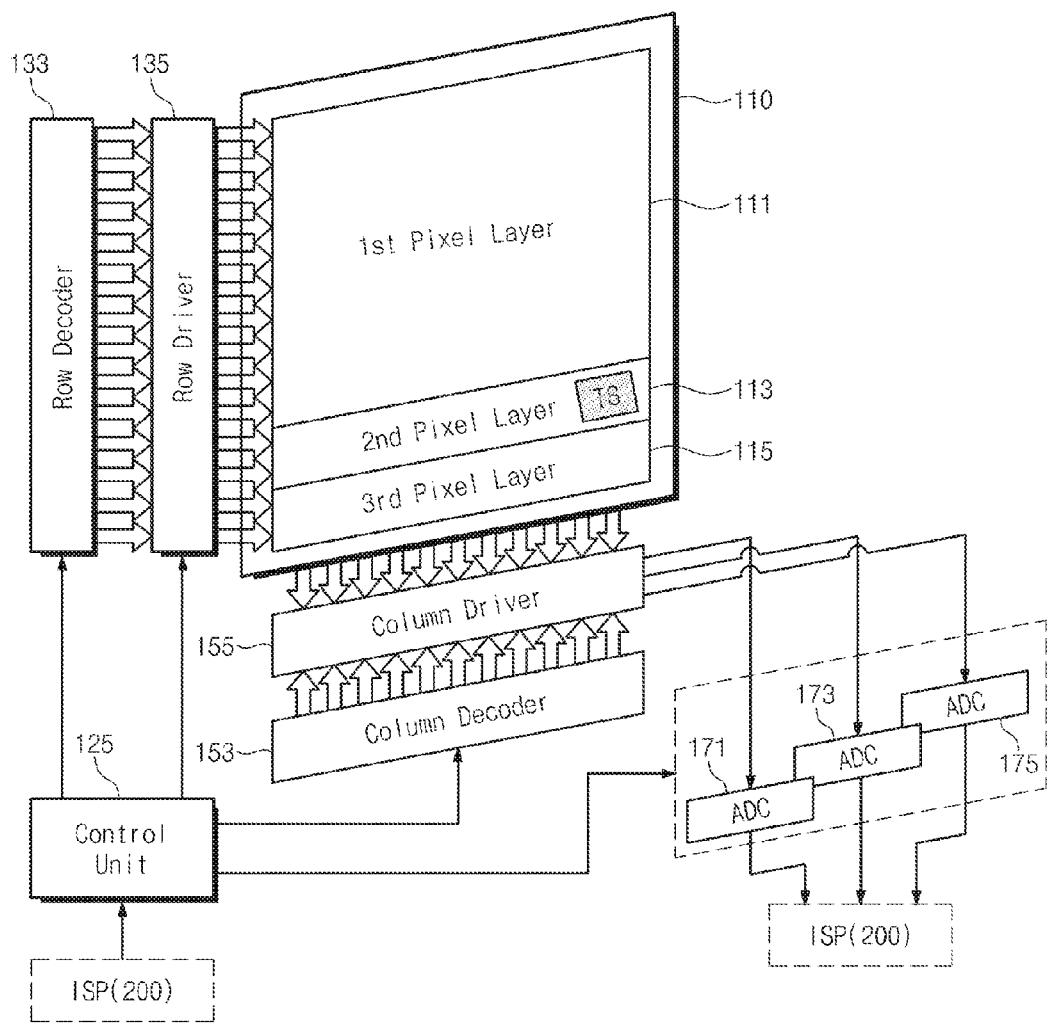
FIG. 9 is a block diagram of an image sensor according to some example embodiments of the inventive concepts.

FIG. 9 is a block diagram of an image sensor 100 according to some example embodiments of the inventive concepts. The image sensor 100 may include the image sensor 10. The image sensor 100 may be included in an image apparatus 1. As illustrated, the image sensor 100 may include a pixel array 110, a control unit 125, a row decoder 133, a row driver 135, a column decoder 153, a column driver 155, and a plurality of analog-digital converters (ADCs) 171, 173, and 175.

The pixel array 110 may sense incident light reflected from an object to generate object information OBI1 associated with the object and/or image information IMI associated with the object. Such information may include images captured ("generated") by one or more pixels of the pixel array 110. The pixel array 110 may include a plurality of pixels arranged in a two-dimensional matrix. The pixel array 110 may include a plurality of pixel layers 111, 113, and 115. In some example embodiments, the pixel array 110 includes three pixel layers 111, 113, and 115, although the pixel array 110, in some inventive concepts, is not limited to three pixel layers.

In some example embodiments, the first pixel array 111 may be a color pixel array. For example, the color pixel array may include Bayer-pattern pixels.

In some example embodiments, the second pixel array 113 may be a depth pixel array. For example, the depth pixel array may include a plurality of 2PD pixels or metal shield pixels. In some example embodiments, the second pixel array 113 may include at least one temperature sensor TS to perform depth correction depending on temperature.

In some example embodiments, the third pixel array 115 may be a thermal pixel array. For example, the thermal pixel array may include a plurality of temperature pixels.

The pixel array 110 may be configured to include at least two pixel arrays to perform different functions.

The control unit 125 may generate control signal(s) to control operations of the row decoder 133, the row decoder 135, the column decoder 153, the column driver 155, and the analog-digital converts (ADCs) 171, 173, and 175. For example, the control unit 125 may generate a plurality of row control signals to select a specific one of the row lines that are included in the stacked pixel layers 111, 113, and 115, respectively.

The row decoder 113 may decode a plurality of row control signals, e.g., row address signals output from the control unit 125 and output a plurality of row selection signals according to a decoding result. In response to the row selection signals output from the row decoder 133, the row driver 135 may drive pixels included in at least one of the rows that are included in the pixel layers 111, 113, and 115, respectively.

The column decoder 153 may decode a plurality of column control signals, e.g., column address signals output from the control unit 125 and output a plurality of column selection signals according to a decoding result. In response to the column selection signals output from the column decoder 153, the column driver 155 may drive a plurality of column lines that are included in the pixels layers 111, 113, and 115, respectively.

For brevity of description, it is shown that the image sensor 100 includes one row driver 135 and one column driver 155. However, in some example embodiments, the image sensor 100 may include a plurality of row driver or column drivers to drive a plurality of row lines or column lines. The image sensor 100 may include a plurality of row decoders or column decoders.

Each of the analog-digital converters (ADCs) 171, 173, and 175 may analog-to-digitally convert signals output from the pixel arrays 111, 113, and 115 and output the analog-to-digitally converted signals to an image signal processor (ISP) 200 as image data. For example, image data may include object information OBI1 and/or image information IMI.

In some example embodiments, each of the analog-digital converters (ADCs) 171, 173, and 175 may further include a correlated double sampling (CDS) circuit to perform correlated double sampling on signals that are output from the pixel layers 11, 113, and 115, respectively. Each of the analog-digital converters (ADCs) 171, 173, and 175 may compare a correlated-double-sampled signal with a lamp signal and output a comparison result as image data.

The image signal processor (ISP) 200 disposed outside the image sensor 100 processes and displays the image data. As described in FIGS. 1 to 8, the image sensor 100 may be configured to correct depth according to local temperature values measured by a temperature sensor TS.

Example embodiments of inventive concepts may be applied to a data processing system.

Figure 10:
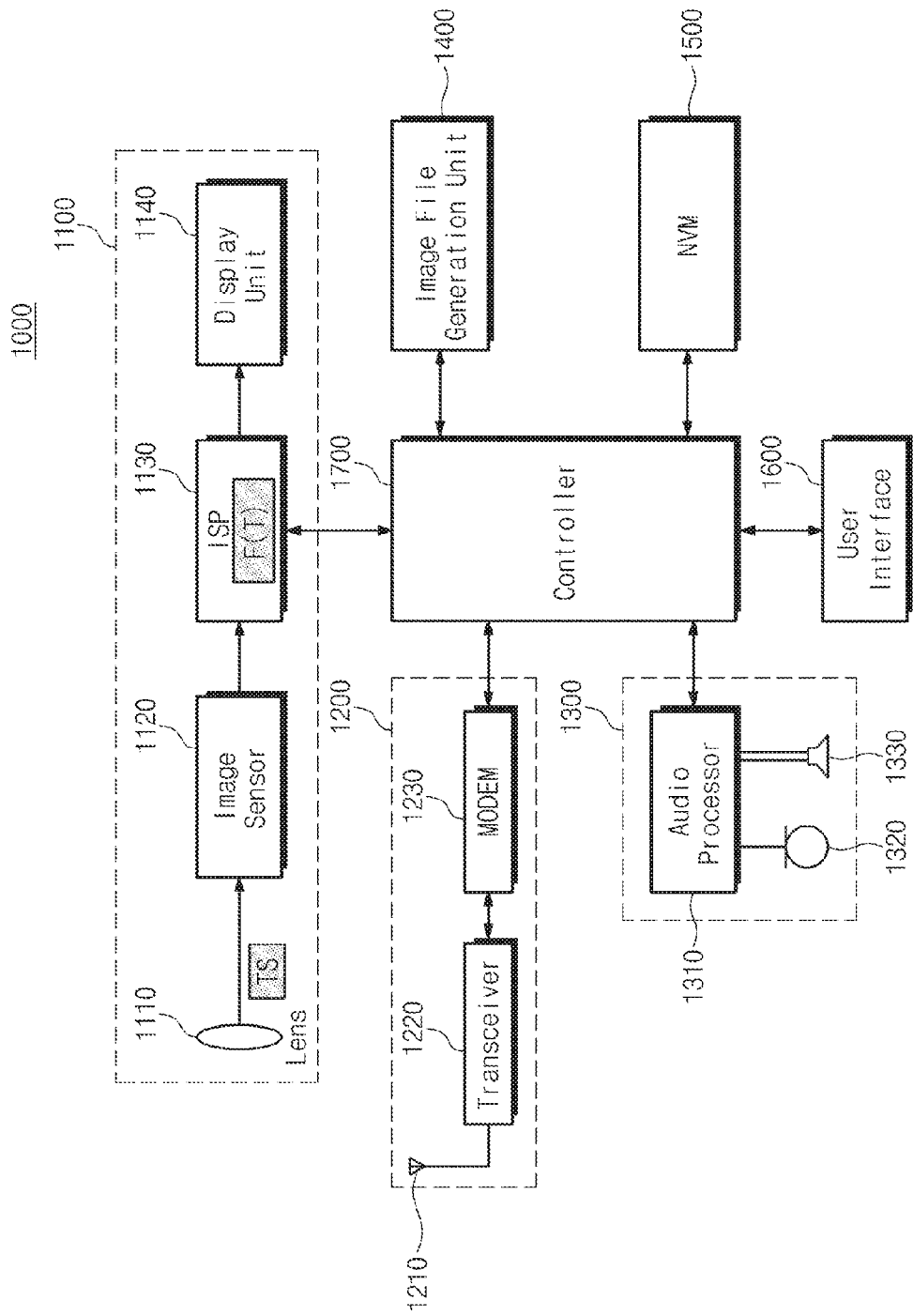
FIG. 10 is a block diagram of a handheld terminal according to some example embodiments of the inventive concepts.

FIG. 10 is a block diagram of a handheld terminal 1000 according to some example embodiments of the inventive concepts. As illustrated, the handheld terminal 1000 includes an image apparatus 1100, a wireless transceiving unit 1200, an audio processing unit 1300, an image file generation unit 1400, a nonvolatile memory device 1500, a user interface 1600, and a controller 1700.

The image apparatus 110 may include the image apparatus 1. The image apparatus 1100 includes a lens 1110, an image sensor 1120, an image single processor 1130, and a display unit 1140. In some example embodiments, the image sensor 1120 may include a pixel array to measure depth described in FIGS. 1 to 8. The image apparatus 1100 may include at least one temperature sensor TS that is disposed at a portion of the lens 1110, outside the lens 1110 or inside the image sensor 1120 and measures temperature.

The image signal processor 1130 may include a temperature focal length variation table F(T). The image apparatus 1100 may use the temperature focal length variation table F(T) to correct a determined depth of an object relative to the image apparatus 1 depending on temperature of the lens 1110 and ambient temperature around the lens 1110, as described with reference to FIGS. 1 to 8. In FIG. 10, the temperature focal length variation table F(T) is stored in an internal memory of the image signal processor 1130. However, example embodiments of inventive concepts are not limited thereto. It should be understood that the temperature focal length variation table F(T) may be stored in a certain type of a memory inside the handheld terminal 1000.

The wireless transceiving unit 1210 includes an antenna, a transceiver 1220, and a modem 1230. The audio processing unit 1300 may include an audio processor 1310, a microphone 1320, and a speaker 1330. A nonvolatile memory device 1500 may be provided as a memory card (e.g., MMC, eMMC, SD, microSD, etc.) according to some example embodiments of the inventive concepts. The controller 1700 may be provided as a system-on-chip (SoC) to drive an application program, an operating system (OS), and the like. A device driver may be included in a kernel of the OS driven by the SoC to control an input/output (I/O) scheduler and a nonvolatile memory device 1500. The device driver may control an access function of the nonvolatile memory device 1500, a central processing unit (CPU) mode of the SoC, and a dynamic voltage and frequency scaling (DVFS) level with reference to the number of synchronous queues managed by the I/O scheduler.

The data processing system 1000 may be applied to mobile phones (e.g., Galaxy, Galaxy Note, iPhone, etc.), table PC (e.g., Galaxy Tab, iPad™, etc.), and digital cameras.

Figure 11:
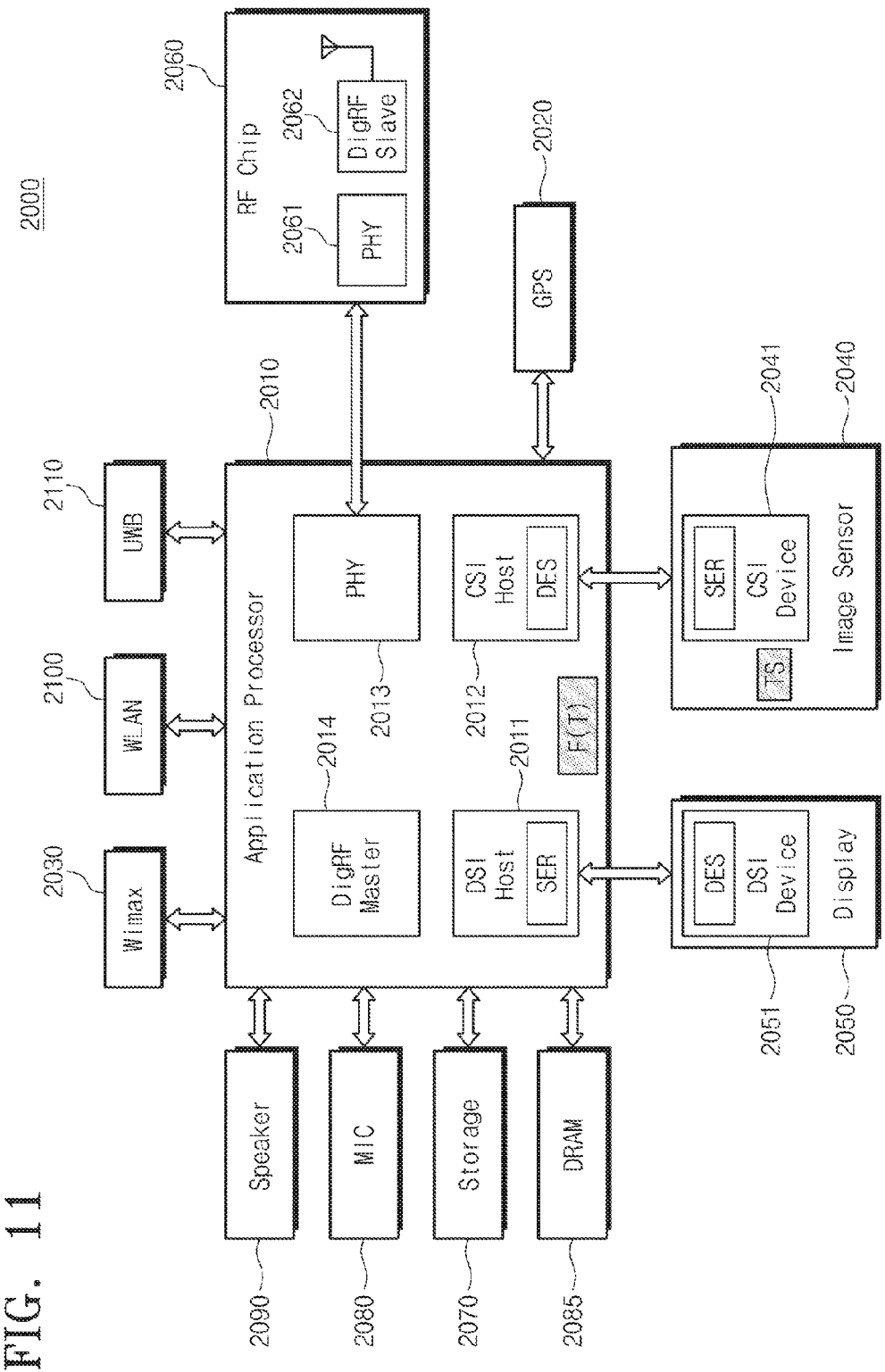
FIG. 11 illustrates an electronic system including an image sensor and an interface according to some example embodiments of the inventive concepts and an interface.

FIG. 11 illustrates an electronic system 2000 including an image sensor and an interface according to some example embodiments of the inventive concepts and an interface. Referring to FIG. 11, the electronic system 2000 may be implemented with a data processing device capable of using or supporting a mobile industry processor interface (MIPI), e.g., a mobile phone, a personal digital assistant (PDA), a portable multimedia player (PMP) or a smartphone. The electronic system 2000 may be included in one or more portions of an image apparatus 1.

The electronic system 2000 may include an application processor 2010, an image sensor 2040, and a display unit 2050.

A camera serial interface (CSI) host 2012 implemented in the application processor 2010 may perform serial communication with a CSI device 2041 of the image sensor 2040 through a CSI. For example, an optical deserializer may be implemented in the CSI host 2012 and an optical serializer may be implemented in the CSI device 2041.

A display serial interface (DSI) host 2011 implemented in the application processor 2010 may perform serial communication with a DSI device 2051 of the display unit 2050 through a DSI. For example, an optical serializer may be implemented in the DSI host 2011 and an optical deserializer may be implemented in the DSI device 2051. In some example embodiments, the application processor 2010 may be configured to generate and/or store a temperature focal length variation table F(T) described with reference to FIGS. 1 to 8.

The image sensor 2040 may be configured to include a filter array for measuring depth and at least one temperature sensor TS for measuring temperature, as described with reference to FIGS. 1 to 8.

The electronic system 2000 may further include a radio-frequency (RF) chip 2060 that is capable of communicating with the application processor 2010. A PHY 20013 of the electronic device 2000 and a PHY 2061 of an RF chip 2060 may exchange data according to a MIPIDigRF 2014.

The electronic system 2000 may further include a global positioning system (GPS) 2020, a storage 2070, a microphone (MIC) 2080, a dynamic random access memory (DRAM) 2085, and a speaker 2090. The electronic system 2000 may perform communication using WiMAX 2030, WLAN 2100, and UWB 2110.

One or more portions of the image apparatus 1, one or more image sensors included therein, some combination thereof, or the like according to one or more example embodiments may be implemented using hardware, software, and/or a combination thereof. For example, hardware devices, including one or more portions of one or more image apparatuses, may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), an application-specific integrated circuit (ASIC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

One or more portions of the image apparatus 1, one or more image sensors included therein, some combination thereof, or the like according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

As described above, a corrected focal length is calculated based on a measured local temperature value, and a depth of an object relative to one or more portions of an image apparatus is calculated using the corrected focal length. Thus, the depth of an object relative to an image apparatus may be measured more accurately based on images of the object that are captured by the image apparatus. A depth of an object relative to an image apparatus may refer to a distance between the object and the image apparatus.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A method for calculating a depth of an object relative to an image apparatus, the image apparatus including a depth pixel array, the depth pixel array including an image pixel, the image pixel including a left pupil sensor and a right pupil sensor, the method comprising:
    generating a left image of the object at the left pupil sensor;
    generating a right image of the object at the right pupil sensor;
    calculating a binocular disparity of the object based on the left image and the right image;
    measuring a local temperature value associated with the image pixel;
    calculating a corrected focal length associated with the image pixel based on the measured local temperature value; and
    calculating the depth of the object relative to the image apparatus, based on both the binocular disparity and the corrected focal length.

2. The method of claim 1, wherein,
    the image apparatus includes a lens configured to direct incident light onto the image pixel, the lens including at least one temperature sensor; and
    measuring the local temperature value associated with the image pixel includes processing sensor data generated by the at least one temperature sensor.

3. The method of claim 1, wherein the image apparatus includes at least one temperature sensor in the depth pixel array.

4. The method of claim 1, further comprising:
    calculating the corrected focal length associated with the image pixel based on a temperature focal length variation table according to the measured local temperature, the temperature focal length variation table including an array of temperature values and corresponding focal length variation values.

5. The method of claim 4, further comprising:
    selecting at least two temperature values included in the temperature focal length variation table, such that at least two corresponding focal length variation values are selected, based on a determination that the measured local temperature value is absent from the temperature focal length variation table; and
    calculating the corrected focal length associated with the image pixel based on the at least two corresponding focal length variations and the measured local temperature value.

6. The method of claim 5, further comprising:
    calculating a focal length variation corresponding to the measured local temperature value based on linear interpolation of the selected at least two temperature values and the at least two corresponding focal length variation values.

7. The method of claim 4, further comprising:
    storing the temperature focal length variation table in an internal memory of the image apparatus.

8. The method of claim 7, further comprising:
    performing contrast autofocus of the left image of the object and the right image of the object to calculate a focal length variation corresponding to the measured local temperature value.

9. The method of claim 8, wherein storing the temperature focal length variation table includes,
    generating a summation image based on the left image and the right image, such that each pixel of the summation image has a pixel value that is a sum of corresponding pixel values of the left image and the right image, wherein the image pixel includes a two-phase detector (2PD) sensor; and
    performing contrast autofocus of the summation image of the object.

10. The method of claim 8, further comprising:
    correcting one of the left image and the right image to generate a corrected image of the object, wherein the image pixel includes a metal shield pixel sensor; and
    performing contrast autofocus of the corrected image.

11. The method of claim 4, further comprising:
    reading the temperature focal length variation table from an internal memory of the image apparatus.

12. A method, comprising:
    measuring a first local temperature value associated with an image apparatus based on processing sensor data generated by at least one temperature sensor;
    performing a first contrast autofocus of at least one image captured by the image apparatus to calculate a first autofocus step code, based at least in part upon the measured first local temperature value;
    measuring a second local temperature value based on processing sensor data generated by the at least one temperature sensor, the second local temperature value being different from the first local temperature value;

performing a second contrast autofocus of at least one image captured by the image apparatus to calculate a second autofocus step code, based at least in part upon the measured second local temperature value; and calculating a focal length variation based on both the first autofocus step code and the second autofocus step code.

13. The method of claim 12, further comprising:
determining whether the second local temperature value is greater than the first local temperature value by at least a first temperature value.

14. The method as set forth in claim 13, further comprising:
performing the second contrast autofocus based on a determination that the second local temperature value is greater than the first local temperature value by at least the first temperature value.

15. The method as set forth in claim 12, further comprising:
establishing an association between the focal length variation and the second local temperature value; and
storing the established association between the focal length variation and the second local temperature value in a memory.

16. A method for calculating a depth of an object relative to an image apparatus, the image apparatus including an image sensor and a lens configured to direct incident light of the image sensor, the method comprising:
capturing a plurality of images of the object at separate, respective portions of the image sensor;
calculating a binocular disparity of the object based on the plurality of images;
measuring a current local temperature value associated with the lens;
performing a contrast autofocus of at least one image of the plurality of images to calculate an autofocus step code, based at least in part upon the measured current local temperature value;
calculating a focal length variation based on both the autofocus step code and a second autofocus step code, the second autofocus step code being associated with a reference focal length of the lens, the reference focal length being associated with a reference local temperature value;
calculating a corrected focal length of the lens based on the focal length variation; and
calculating the depth of the object relative to the image apparatus, based on both the binocular disparity and the corrected focal length.

17. The method of claim 16, further comprising:
generating a summation image based on a left image of the plurality of images and a right image of the plurality of images, such that each pixel of the summation image has a pixel value that is a sum of corresponding pixel values of the plurality of images; and
performing the contrast autofocus of the summation image of the object to calculate the autofocus step code.

18. The method of claim 17, further comprising:
correcting at least one image of the plurality of images to generate at least one corrected image of the object; and
performing the contrast autofocus of the summation image of the object to calculate the autofocus step code.

19. The method of claim 16, further comprising:
performing the contrast autofocus based on a determination that the current local temperature value is greater than the reference local temperature value by at least a first temperature value.

20. The method of claim 16, wherein the focal length variation corresponds to a value obtained by subtracting the autofocus step code from a reference autofocus step code, the reference autofocus step code being associated with the reference local temperature value.

* * * * *